US008310378B2

United States Patent
Suddreth

(10) Patent No.: US 8,310,378 B2
(45) Date of Patent: Nov. 13, 2012

(54) METHOD AND APPARATUS FOR DISPLAYING PRIORITIZED PHOTO REALISTIC FEATURES ON A SYNTHETIC VISION SYSTEM

(75) Inventor: John G. Suddreth, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 487 days.

(21) Appl. No.: 12/254,614

(22) Filed: Oct. 20, 2008

(65) Prior Publication Data

US 2010/0097241 A1    Apr. 22, 2010

(51) Int. Cl.
*G01C 21/00*    (2006.01)
*G01C 23/00*    (2006.01)
(52) U.S. Cl. ............ 340/971; 340/945; 342/180
(58) Field of Classification Search .......... 340/945–980; 463/33; 345/426; 342/180
See application file for complete search history.

(56) References Cited

U.S. PATENT DOCUMENTS

| 6,329,986 B1 | 12/2001 | Cheng |
| 2005/0052714 A1* | 3/2005 | Klug et al. ............ 359/3 |
| 2007/0018887 A1 | 1/2007 | Feyereisen et al. |
| 2007/0088491 A1 | 4/2007 | He |
| 2007/0203620 A1* | 8/2007 | Gremmert ............ 701/9 |

OTHER PUBLICATIONS

EP Search Report, EP 09173170.3 dated Feb. 2, 2010.

\* cited by examiner

*Primary Examiner* — Daniel Wu
*Assistant Examiner* — Frederick Ott
(74) *Attorney, Agent, or Firm* — Ingrassia Fisher & Lorenz, P.C.

(57) ABSTRACT

An apparatus and method for displaying photo realistic features (230, 232, 234) on a display (116) of an aircraft (218) include storing (302) a plurality of photo realistic features (230, 232, 234), the photo realistic features including at least one of terrain (230) and obstacle (232) features. A priority factor is determined (304) that is based on one of, for example, aircraft type, speed, and altitude, and a plurality of display state is prioritized (304) for each of the plurality of photo realistic features (230, 232, 234) in accordance with the priority factor. One of the first and second display states is displayed (308) for each of the plurality of photo realistic features (230, 232, 234) as determined by the prioritizing step (306).

15 Claims, 3 Drawing Sheets

METHOD AND APPARATUS FOR DISPLAYING PRIORITIZED PHOTO REALISTIC FEATURES ON A SYNTHETIC VISION SYSTEM

CROSS-REFERENCE TO RELATED APPLICATION

This application is related to U.S. patent application Ser. No. 12/183,693, assigned to the Assignee of the present application.

FIELD OF THE INVENTION

The present invention generally relates to a system for increasing aircraft safety and more particularly to a method and apparatus for improving the visual display of photo realistic features to a pilot during approach and landing.

BACKGROUND OF THE INVENTION

Pilots typically rely on both ground references and instruments when navigating from one point to another. Aircraft flying at 35,000 feet generally rely more on instruments while helicopters flying at 500 feet typically rely more on ground references. During approach and landing, they may rely more on ground references if the weather permits.

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments to some extent during the approach. However, the pilot must transition from instruments to ground references at some point during landing.

The next generation of aircraft synthetic vision systems, or display systems in general, will use photo realistic textures on the terrain and other three dimensional objects such as buildings. However, photo realistic presentations can add clutter (information overload), thereby impeding a pilot's recognition and understanding of the object or objects being displayed.

Accordingly, it is desirable to provide a system and method for improving the ability of the pilot to comprehend displayed photo realistic textures of the terrain and other objects during navigation of the aircraft. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and method for displaying photo realistic features on a display of an aircraft include storing a plurality of photo realistic features, the photo realistic features including at least one of terrain and obstacle features. A priority factor is determined that is based on one of, for example, aircraft type, speed, and altitude, and a plurality of display states is prioritized for each of the plurality of photo realistic features in accordance with the priority factor. One of the first and second display states is displayed for each of the plurality of photo realistic features as determined by the prioritizing step.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The exemplary embodiment described herein prioritizes the photo realistic display of various objects in a desired area, for example a flight path or an approach to an airport, by displaying the objects in such a manner as to improve the pilots understanding thereof by distinguishing important objects from less important objects. This is accomplished by deemphasizing the photo realism of certain objects. In one exemplary embodiment, prioritization data is encoded with photo realistic textures, for example, of a three dimensional object or terrain, and locations thereof are stored in a database. The photo realistic textures are preprocessed with algorithms modifying the display properties of the photo realistic texture based on the prioritization data. Within the prioritization data, a priority is assigned to each of the photo realistic textures in real time by the user, an aircraft system, or an external system. The priority may consider such factors as aircraft type, mission, and the pilot's personal preferences.

Figure 1:
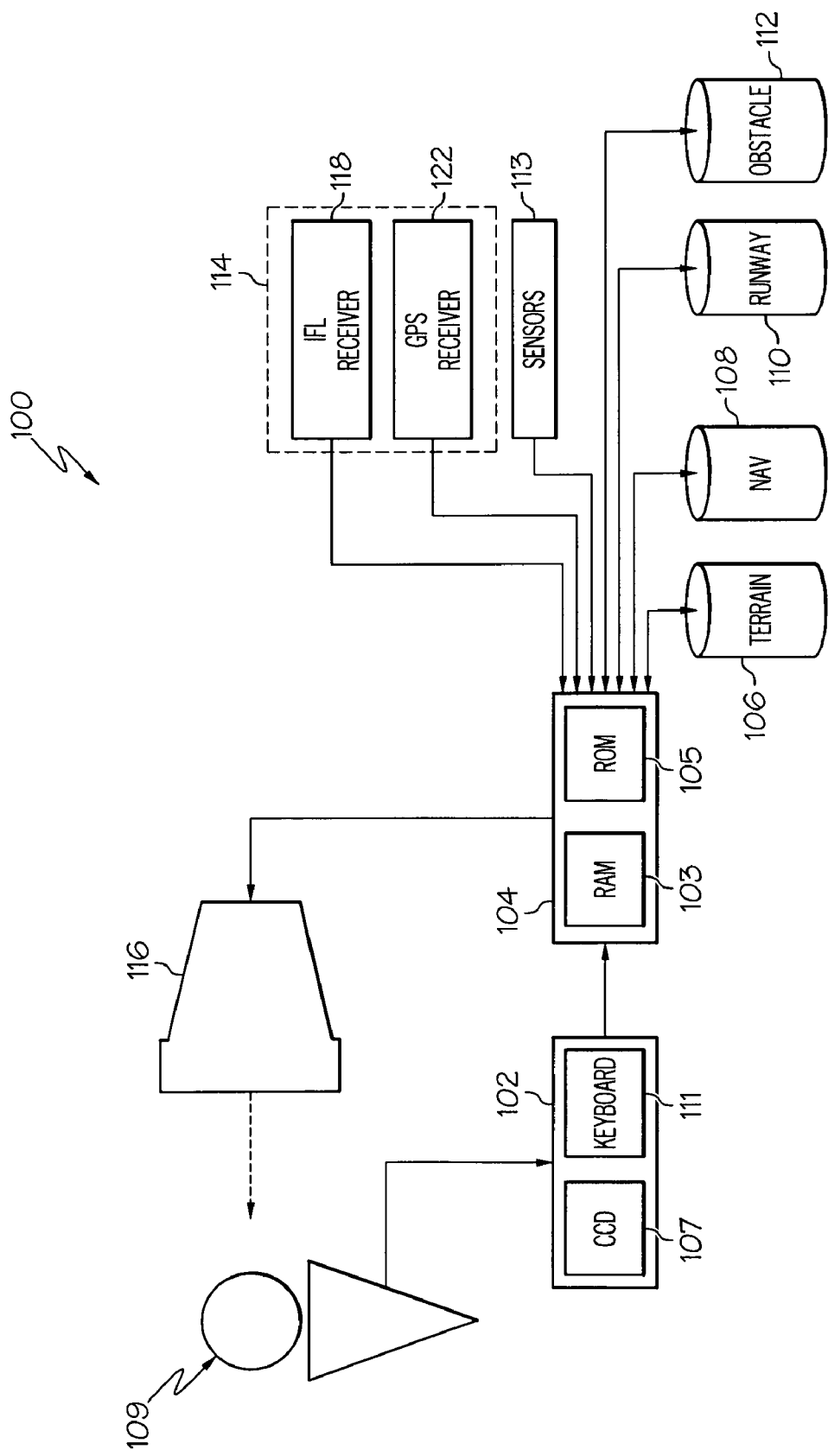
FIG. 1 is a functional block diagram of a flight display system according to an exemplary embodiment.

Referring to FIG. 1, an exemplary flight deck display system is depicted and will be described. The system 100 includes a user interface 102, a processor 104, one or more terrain databases 106 sometimes referred to as a Terrain Avoidance and Warning System (TAWS), one or more navigation databases 108, one or more runway databases 110 sometimes referred to as a Terrain Avoidance and Warning system (TAWS), one or more obstacle databases 112 sometimes referred to as a Traffic and Collision Avoidance System (TCAS), various sensors 113, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 113, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 113, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

The terrain databases 106 also provides information related to the texture of the terrain, e.g., hills, depressions, lakes, and may include a prioritization of each of the textured features.

It will be appreciated that, although the terrain databases 106, the navigation databases 108, the runway databases 110, and the obstacle databases 112 are, for clarity and convenience, shown as being stored separate from the processor 104, all or portions of either or both of these databases 106, 108, 110, 112 could be loaded into the RAM 103, or integrally formed as part of the processor 104, and/or RAM 103, and/or ROM 105. The databases 106, 108, 110, 112 could also be part of a device or system that is physically separate from the system 100.

The sensors 113 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a flight director and a navigation computer, just to name a couple. However, for ease of description and illustration, only an instrument landing system (ILS) receiver 118 and a global position system (GPS) receiver 122 are depicted in FIG. 1.

The sensors 113 also detect an area or item of interest, such as a particular structure, hill, aircraft, or other threat which would become a higher priority as it becomes more of a hazard to flight safety due to the aircraft's course, altitude, and/or speed. This higher priority results in the photorealistic feature being highlighted on the display 116.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, pictorial, and/or iconic information, and thereby supply visual feedback to the user 109. It will be appreciated that the display device 116 may be implemented using any one of numerous known display devices suitable for rendering textual, graphic, pictorial, and/ or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection (for which only the higher priority features may be displayed) or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Most modern displays additionally allow a vehicle flight plan to be displayed from different views, either a lateral view, a vertical view, or perspective views which can be displayed individually or simultaneously on the same display. The exemplary embodiment described herein may be utilized with either of the lateral, vertical, or perspective views. The lateral view, generally known as a lateral map display, is basically a top-view of the aircraft flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids.

The perspective view provides a three-dimensional view of the vehicle flight plan. The perspective view display, as shown by the display 116 (FIG. 2), may include one or more of the above-mentioned features that are displayed on the lateral map.

Figure 2:
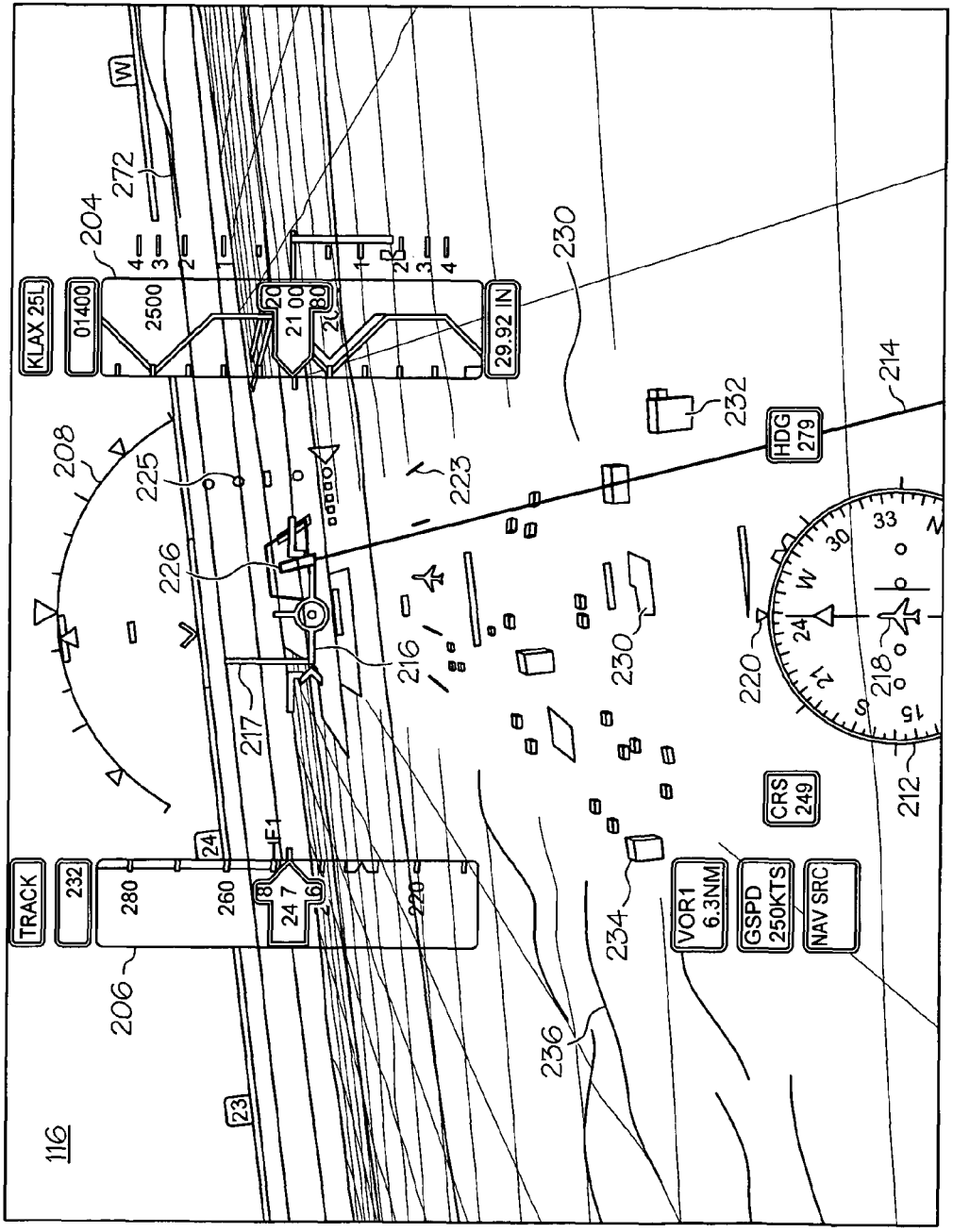
FIG. 2 is an exemplary image that may be rendered on the flight display system of FIG. 1.

Referring to FIG. 2, exemplary textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, a compass 212, an extended runway centerline 214, and a flight path vector indicator 216. The heading indicator 212 includes an aircraft icon 218, and a heading marker 220 identifying the current heading (a heading of 248 degrees as shown). The compass 212 can be shown either in heading up, or track up mode with airplane symbol 218 representing the present lateral position. Additional information (not shown) is typically provided in either graphic or numerical format representative, for example, of glide slope, altimeter setting, and navigation receiver frequencies.

Perspective conformal lateral deviation symbology provides intuitive displays to flight crews of current position in relation to an intended flight path. In particular, lateral deviation marks 223 and vertical deviation marks 225 on perspective conformal deviation symbology represent a fixed ground distance from the intended flight path and are used to represent both present deviations from the centerline of the runway 226 and direction of aircraft movement. As the aircraft pitches, ascends or descends, the display distance between the deviation marks 223, 225 will vary. However, the actual ground distance from the intended flight path represented by the deviation marks 223, 225 remains the same. Therefore, flight crews can determine position information with reduced workload by merely observing the position of the aircraft in relation to the deviation marks 223, 225. Regardless of attitude or altitude, flight crews know how far off course an aircraft is if the aircraft is a given number of deviation marks 223, 225 from the intended flight path. The acceleration cue 217 is a marker, sometimes called a "carrot", on or near one of the horizontal lines of the flight path marker 216. The marker 217 typically moves vertically upward, or becomes longer, when the plane accelerates (or the wind increases), or vertically downward, or becomes shorter, when the plane decelerates.

In accordance with the exemplary embodiment, a prioritization of photo realistic features is used to enhance simulated positional awareness by displaying terrain 230 and obstacles 232 on the graphical display 116 based on the prioritization scheme and current aircraft position and trajectory, and enable flight crews to maintain overall awareness during low visibility conditions but also enable flight crews who are unfamiliar with the flight path or an airport, for example, to maintain overall awareness of their current position. This awareness is accomplished through an intuitive and easy to understand prioritization of photo realistic features on the visual display 116. Important identification markers and obstacles are highlighted while less important markers and obstacles are deemphasized, thereby allowing the flight crews to better avoid dangerous runway intrusions while landing. For example, the identification of the targeted runway 226 on final approach may be highlighted while an obstacle 234 well left of the runway's centerline may be deemphasized. This de-emphasis may include, for example, dimming, blurring, less resolution, and reduced color saturation. Generic synthetic terrain may be augmented by prioritized photorealistic features. The photo realistic features display include, for example, terrain having texture, buildings having windows and antennas on the roof, hills lakes having authentic color.

While the exemplary embodiment described herein is a display system for an aircraft, other types of craft, such as water craft, may also utilize the apparatus and method claimed. One important aspect of situational awareness is to be aware of terrain and obstacles which pose a threat to the craft. This is particularly true for aircraft during take-off and landing or other low altitude operations and even more so in low visibility conditions. Some displays depict information on terrain and obstacles in or near the craft's travel path. This terrain and obstacle data should be presented in such a way that it will provide timely awareness of the height, location, and distance of possible threats without distracting from the other primary information on the display. In order to successfully avoid the terrain and obstacles, the operator will have a short response time in which to determine how to best avoid obstacles.

On many occasions, terrain or an obstacle may be considered a marker, or an identification point, informing the pilot of his position with respect to a desired flight path or a targeted runway, for example. In this case, while the terrain or obstacle may not be much of a hazard to flight safety, it may assist the pilot in determining his position relative to the obstacle.

The processor 104 generates data for display on the display 116 based on the position of the aircraft, terrain, and obstacle data. The processor 104 may be configured to receive and process navigation and positional data, for example, position, speed, direction) regarding current aircraft location from the navigation database 108. The navigation database 108 is configured to store data concerning one or more flight paths. Obstacles can be sought and displayed for different locations along one or more flight paths, thereby assisting an operator choose the safest path to follow.

The terrain database 106 and obstacle database 112 may contain data regarding terrain and obstacles, respectively, and more specifically pictures or pictorial representations thereof, wherein the processor 104 sends a signal to the display 116 to render pictorial images of the obstacles, wherein the processor 104 sends a signal to display the actual image based on the positional data.

The processor 104 analyzes the data received from the obstacle database 112 and determines if the obstacles are within a selected distance from the aircraft. Obstacles that are not within a selected distance are not displayed. This procedure saves processor load and reduces display clutter by only displaying obstacles that are of interest to the aircraft. Size, speed, and altitude of the aircraft and size of the obstacle may be considered along with distance in determining whether to display the obstacle.

For simplicity of discussion, the term "terrain" is referenced hereinafter to include earth referenced subjects including, but not limited to, ground including hills and lakes, and the like.

Notably, the visibility of the terrain information displayed on the screen of visual display 116 may be enhanced responsive to one or more suitable algorithms (e.g., implemented in software) executed by the processor 104, which functions to determine an aircraft's current position, heading and speed, and initially loads a patch of terrain and obstacle data for a region that is suitably sized to provide a rapid initialization of the data, the data correction, and also sized for a reasonable amount of flight time. The processor 104 monitors the aircraft's position, heading, and speed (e.g., also attitude when pertinent), and continuously predicts the potential boundaries of a three-dimensional region (volume) of terrain in the flight path based on the aircraft's then-current position, heading, speed, (e.g., and attitude when pertinent), and may include trajectory (intended flight path). The processor 104 compares the predicted boundaries with the boundaries of the initially loaded terrain and obstacle data, and if the distance from the aircraft to a predicted boundary is determined to be less than a predetermined value (e.g., distance value associated with the boundaries of the initially loaded data), then the processor 104 initiates an operation to load a new patch of terrain and obstacle data that is optimally sized given the aircraft's current position, heading and speed (e.g., and attitude when pertinent). Notably, for this example embodiment, the processor 104 can execute the data loading operations separately from the operations that determine the aircraft's current position, heading and speed, in order to maintain a constant refresh rate and not interfere with the continuity of the current display of terrain.

Figure 3:
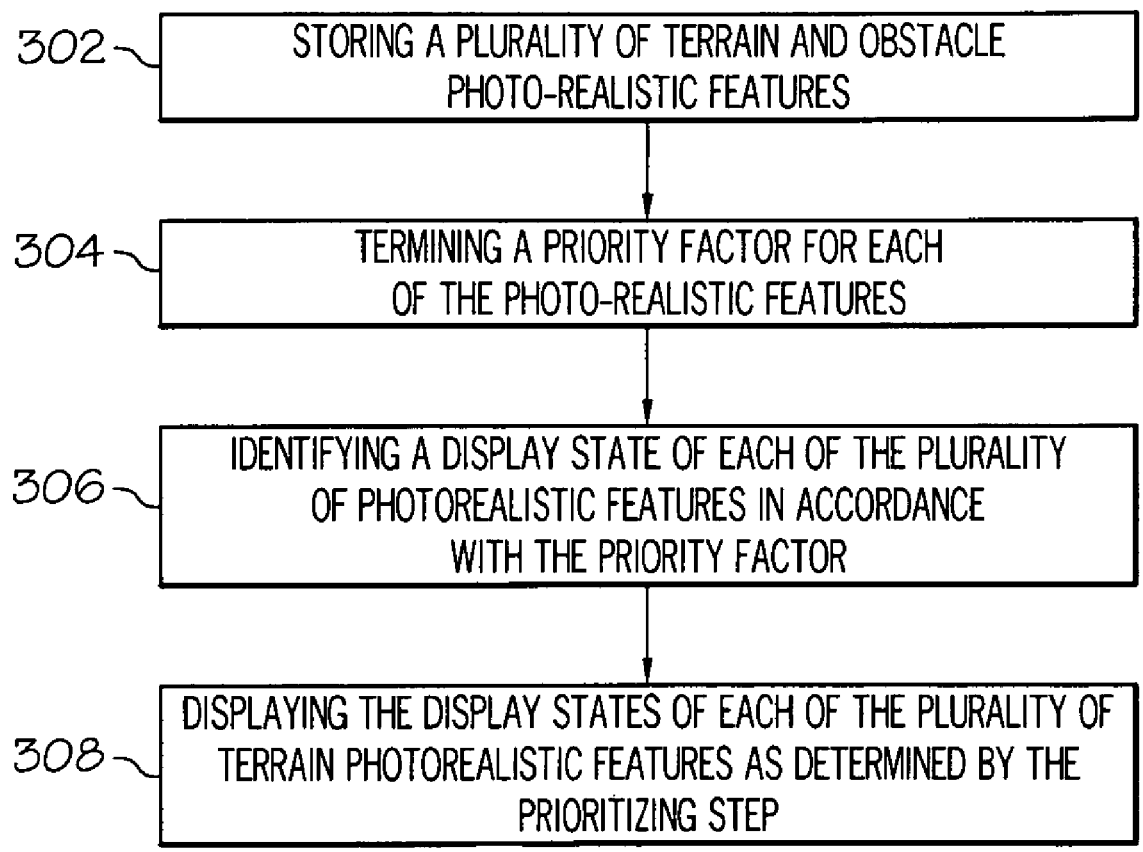
FIG. 3 is a flow chart of the steps illustrating an exemplary embodiment.

Therefore, a system and method are provided for enhancing the visibility and understanding of terrain information on an electronics aircraft display, in which high photo realistic terrain features for selected regions can be presented on a display. More specifically as shown in FIG. 3, a plurality of terrain and obstacle photo realistic features are stored 302 as individual data points in terrain and obstacle databases 106, 112, respectively. A priority factor is determined 304 for each of the photo realistic features based on information, including for example, aircraft speed, altitude, and type, terrain or obstacle height and distance from the aircraft planned flight path. A display state of each of the plurality of photo realistic features is identified 306 in accordance with the priority factor. The display state may include an emphasized picture, a deemphasized picture, or the lack of a picture. The display states of each of the plurality of terrain and obstacle photo realistic features as determined by the identifying step 306 are displayed 308. It should be understood that the photo realistic features may be an area or radius around a designated point, e.g., an intersection of two roads and a small surrounding area may be made photorealistic on the display on a medical helicopter making a pickup of an accident victim.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for displaying photo realistic features on a display on a mobile craft, comprising:
    displaying a synthetic vision image including at least one three dimensional object;
    storing a plurality of photo realistic features, wherein each photo realistic feature comprises a photo of the three dimensional object;
    determining a priority factor for each of the photo realistic features associated with the three dimensional object;
    eliminating the photo realistic features having a priority factor below a threshold;
    identifying a display state of each of the remaining photo realistic features in accordance with the priority factor;
    displaying over the synthetic vision image the display state of each of the remaining photo realistic features as determined by the identifying step; and
    wherein the identifying step comprises identifying a deemphasized state for at least one photo realistic feature, wherein the deemphasized state is selected from the group consisting of dimming, blurring, reduced resolution, and reduced color saturation.

2. The method of claim 1 wherein the storing step comprises storing terrain features, wherein the terrain features includes texture.

3. The method of claim 1 wherein the determining step comprises considering at least one of the priority factors selected from the group consisting of mobile craft mission, mobile craft size, mobile craft altitude, operator preference, or size of the object.

4. The method of claim 1 wherein the storing step comprises storing a hazard to craft movement.

5. The method of claim 1 wherein the storing step comprises storing a marker to improve adherence to a desired path.

6. The method of claim 1 wherein the storing step includes storing prioritization data.

7. A method for displaying photo realistic features on a display of an aircraft, comprising:
    displaying a synthetic vision image including at least one three dimensional object;
    storing a plurality of photo realistic features, each of the photo realistic features comprising a photo of the three dimensional obstacle;
    determining a priority factor for each of the photo realistic features based on at least one of the factors selected from the group consisting of mobile craft mission, mobile craft size, mobile craft altitude, operator preference, or size of the object;
    eliminating the photo realistic features having a priority factor below a threshold;
    prioritizing a first and second display state of each of the plurality of photo realistic features in accordance with the priority factor;
    displaying over the synthetic vision image one of the first and second display states of each of the plurality of photo realistic features as determined by the prioritizing step; and
    wherein the identifying step comprises identifying a deemphasized state for at least one photo realistic feature, wherein the deemphasized state is selected from the group consisting of dimming, blurring, reduced resolution, and reduced color saturation.

8. The method of claim 7 wherein the determining step includes determining a priority factor from data provided from one of the group consisting of a database, an external sensor, and pilot input.

9. A display system for an aircraft, comprising:
a system configured to display a synthetic vision image including at least one three dimensional object;
a database comprising a plurality of photo realistic features, each having a plurality of display states, wherein each photo realistic feature comprises a photo of at least one of the three dimensional object;
a processor capable of generating symbology commands identifying the display states in response to a prioritization factor;
eliminating the photo realistic features having a priority factor below a threshold;
a first display for displaying the photo realistic features over the synthetic vision image in response to the symbology commands; and
wherein the symbology commands comprise identifying a deemphasized state, wherein the deemphasized state is selected from the group consisting of dimming, blurring, reduced resolution, and reduced color saturation.

10. The display system of claim 9 wherein the database comprises a plurality of terrain features, wherein the photo realistic features includes terrain texture.

11. The display system of claim 9 wherein the database comprises a plurality of obstacle features.

12. The display system of claim 9 wherein the prioritization factor comprises at least one of the factors selected from the group consisting of aircraft type, speed, altitude, position, and trajectory.

13. The display system of claim 9 wherein one of the photo realistic features comprises a hazard to aircraft movement.

14. The display system of claim 9 wherein one of the photo realistic features comprises a marker to improve adherence to a desired path.

15. The display system of claim 9 wherein:
the database stores photo realistic features for two flight paths;
the displaying step comprises displaying the photo realistic features for the two flight paths; and
the processor is configured to receive an input identifying a desired flight path.

* * * * *